United States Patent [19]

Labana et al.

[11] 4,044,070

[45] Aug. 23, 1977

[54] POWDER PAINT BLENDS OF AN EPOXY AND HYDROXY-FUNCTIONAL COPOLYMER AND A CARBOXY-TERMINATED COPOLYMER

[75] Inventors: Santokh S. Labana, Dearborn Heights; Ares N. Theodore, Farmington, both of Mich.

[73] Assignee: Ford Motor Company, Dearborn, Mich.

[21] Appl. No.: 659,178

[22] Filed: Feb. 18, 1976

Related U.S. Application Data

[62] Division of Ser. No. 426,164, Dec. 19, 1973, Pat. No. 3,959,405.

[51] Int. Cl.$^2$ ............................................. C08L 63/10
[52] U.S. Cl. ..................... 260/836; 260/827; 260/830 R; 260/830 TW; 260/DIG. 16; 260/DIG. 17; 260/DIG. 19
[58] Field of Search ........................... 260/836, 830 R

[56] References Cited

U.S. PATENT DOCUMENTS

| | | | |
|---|---|---|---|
| 3,730,930 | 5/1973 | Labana | 260/23 EP |
| 3,752,870 | 8/1973 | Labana | 260/836 |
| 3,758,632 | 9/1973 | Labana | 260/830 R |
| 3,781,379 | 12/1973 | Theodore | 260/836 |
| 3,781,380 | 12/1973 | Labana | 260/836 |
| 3,787,521 | 1/1974 | Labana | 260/836 |
| 3,876,587 | 4/1975 | Matsui | 260/78.4 D |
| 3,888,943 | 6/1975 | Labana | 260/830 R |
| 3,914,333 | 10/1975 | Labana | 260/830 R |
| 3,932,320 | 1/1976 | Camelon | 260/17 R |
| 3,932,347 | 1/1976 | Camelon | 260/42.14 |
| 3,939,127 | 2/1976 | Labana | 260/78.4 D |

*Primary Examiner*—Paul Lieberman
*Attorney, Agent, or Firm*—Olin B. Johnson; Keith L. Zerschling

[57] ABSTRACT

Powder coating compositions are disclosed which comprise a blend of coreactable, thermosettable copolymers one of which has at least two different functional groups while the other is qualitatively monofunctional and quantitatively polyfunctional. Ordinarily, the polymer having at least two different functional groups, will be quantitatively polyfunctional and qualitatively difunctional although it may contain more than two different functional groups. In the preferred embodiments, the first or difunctional copolymer of the blend has either (1) epoxy functionality and amide functionality, (2) epoxy functionality and hydroxy functionality, (3) carboxy functionality and amide functionality, or (4) carboxy functionality and hydroxy functionality and is crosslinkable with the second copolymer through at least two different types of functional groups on the first copolymer. The second copolymer has only one type of functionality that is crosslinkable with the functional groups on the first copolymer and may be termed the monofunctional copolymer although it is quantitatively polyfunctional. The second copolymer may have as its functionality (1) anhydride functionality, (2) carboxy functionality or (3) epoxy functionality. The second copolymer is advantageously employed in an amount such that it provides about 0.4 to about 1.4, preferably about 0.8 to about 1.1, functional groups per functional group on the first copolymer.

2 Claims, No Drawings

POWDER PAINT BLENDS OF AN EPOXY AND HYDROXY-FUNCTIONAL COPOLYMER AND A CARBOXY-TERMINATED COPOLYMER

This is a division of application Ser. No. 426,164, filed Dec. 19, 1973, now U.S. Pat. No. 3,959,405.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) an epoxy-functional and hydroxy-functional copolymer, (2) a monomeric anhydride or a homopolymer of a monomeric anhydride, and (3) a hydroxy carboxylic acid have been described in U.S. patent application Ser. No. 394,876, filed Sept. 6, 1973 by A. N. Theodore, a coinventor herein, E. C. Siwiec and H. Van Oene. Powder coating compositions comprising (1) an epoxy-functional copolymer and (2) an anhydride crosslinking agent have been described heretofore in our copending U.S. patent application Ser. No. 172,224, filed Aug. 16, 1971; in U.S. Pat. No. 3,758,632; in U.S. patent application Ser. No. 394,887, filed Sept. 6, 1973 by A. N. Theodore, a coinventor herein, E. C. Siwiec and H. Van Oene, in U.S. patent application Ser. No. 394,878, filed Sept. 6, 1973 by A. N. Theodore, a coinventor herein, E. C. Siwiec and H. Van Oene, in our U.S. patent application Ser. No. 394,879, filed Sept. 6, 1973; in U.S. patent application Ser. No. 394,880, filed Sept. 6, 1973 by S. S. Labana, a coinventor herein, and S. C. Peng and in our U.S. patent application Ser. No. 394,881, filed Sept. 6, 1973. Powder coating compositions comprising (1) an epoxy-functional, hydroxy-functional copolymer and (2) a dicarboxylic acid crosslinking agent are disclosed in our U.S. patent application Ser. No. 394,874 filed Sept. 6, 1973. Powder coating compositions comprising (1) an epoxy-functional, amide-functional copolymer and (2) a carboxy terminated polymer, e.g., a carboxy terminated polyester, are disclosed in U.S. patent application Ser. No. 394,875 filed Sept. 6, 1973 by J. D. Nordstrom and S. C. Peng.

In the preparation, storage and use of powder coating compositions a variety of problems arise which are either peculiar to powder coating materials or are common to other forms of coating but differ in degree or form in powder coating materials. These include lack of component compatibility, i.e., phase separation, resistance to pigment dispersion, caking, etc. For example, both monomeric anhydrides and homopolymers of monomeric anhydrides, e.g., poly (azelaic anhydride) and poly (adipic anhydride), make effective crosslinking agents for suitable copolymers, e.g., epoxy-functional copolymers. Care must be exercised, however, in the preparation and use of such coating compositions in that monomeric anhydrides tend to sublime during processing and powders containing polyanhydrides of the type above described have a tendency to cake.

THE INVENTION

The problems associated with many powder coating compositions are avoided or reduced by employing as the reactive ingredients an intimate blend of coreactable, thermosettable copolymers one of which has at least two different functional groups while the other is qualitatively monofunctional and quantitatively polyfunctional. In the preferred embodiments, the first or difunctional copolymer will be qualitatively-difunctional, although they may contain more than two different functional groups, and quantitatively polyfunctional. In the preferred embodiments, the first or difunctional copolymer of the blend has either (1) epoxy functionality and amide functionality (2) epoxy functionality and hydroxy functionality, (3) carboxy functionality and amide functionality, or (4) carboxy functionality and hydroxy functionality and is crosslinkable with the second copolymer through at least two different types of functional groups on the first copolymer. The second copolymer has only one type of functionality that is crosslinkable with the functional groups on the first copolymer and may be termed the monofunctional copolymer although it is quantitatively polyfunctional. The second copolymer may have its functionality (1) anhydride functionality, (2) carboxy functionality or (3) epoxy functionality. The second copolymer is advantageously employed in an amount such that it provides about 0.4 to about 1.4, preferably about 0.8 to about 1.1, functional groups per functional group on the first copolymer.

These copolymers have a glass transition temperature (Tg) in the range of 40° to 90° C., preferably between 50° and 80° C., and a molecular weight ($\overline{M}_n$) in the range of about 1500 to about 15,000, preferably about 2500 to about 6000.

The powder coating compositions of this invention demonstrate excellent component compatibility, suitability for effective pigment dispersion and resistance to caking.

DETAILED DESCRIPTION OF THE INVENTION

The copolymers employed in the powder coating compositions of this invention are readily formed by conventional free radical induced polymerization of the olefinically unsaturated monomers employed. Generally, a free radical initiator is needed to induce the polymerization reaction. A large number of free radical initiators are known to the art and are suitable for this purpose. These include benzoyl peroxide, lauryl peroxide, t-butylhydroxy peroxide, acetylcyclohexane sulfonyl peroxide, diisobutyrl peroxide, di- (2-ethylhexyl) perpxypivalate, decanoyl peroxide, azobis (2-methylpropionitrile), etc. The polymerization is preferably carried out in solution using a solvent in which the copolymer is soluble. Toluene, xylene, dioxane, butanone and others are suitable solvents for these polymerizations.

The preparation of these copolymers can be illustrated with the epoxy-functional, hydroxy-functional copolymer. This copolymer advantageously contains about 5 to about 20, preferably about 8 to about 15, weight percent of a glycidyl ester of a monoethylenically unsaturated acid, e.g., glycidyl acrylate or glycidyl methacrylate, about 2 to about 10, preferably about 3 to about 6, weight percent of a hydroxyacrylate, e.g., a monohydroxy ester of a $C_2 - C_4$ diol and acrylic or methacrylic acid, and about 70 to about 93, preferably about 79 to about 89, weight percent of monoethylenically unsaturated, quantitatively and qualitatively monofunctional monomers. A monoethylenically unsaturated monomer that is both qualitatively and quantitatively monofunctional has as its sole operative functionality its one olefinic unsaturation group, e.g., styrene, methyl methacrylate, etc.

The monoethylenically unsaturated, qualitatively and quantitatively monofunctional monomers are preferably monomers having alpha-beta olefinic unsaturation. These can be acrylates or a mixture of acrylates and monovinyl hydrocarbons. Preferably, in excess of fifty (50) weight percent of the copolymer monomers are esters of a $C_1 - C_8$ monohydric alcohol and acrylic or methacrylic acid, i.e., methyl methacrylate, ethyl acrylate, butyl acrylate, hexyl acrylate, and 2-ethylhexyl methacrylate. $C_8 - C_9$ monovinyl hydrocarbons such as styrene, alpha methyl styrene, vinyl toluene, t-butyl styrene, and chlorostyrene are typical of the vinyl hydrocarbons and substituted vinyl hydrocarbons which are suitable for this purpose.

If the epoxy-functional, hydroxy-functional copolymer is prepared in solution, the solid copolymer can be precipitated by pouring the solution at a slow rate into a nonsolvent for such copolymer such as hexane, octane or water under suitable agitation conditions. The copolymer thus obtained is further dried so that it contains less than about three percent of the materials that volatilize at the temperatures used for baking the coatings.

These copolymers can also be prepared by emulsion polymerization, suspension polymerization, bulk polymerization or their suitable combinations. In these methods of preparing the copolymer, chain transfer agents may be required to control the molecular weight of the copolymer to a desired range. The solid copolymers obtained by these methods must also be dried to contain less than about three percent of the materials that volatilize at the temperatures used for baking the coatings.

For powder coating applications, both molecular weight and molecular weight distribution of the copolymer are important. While the molecular weight ($\overline{M}_n$) range extends from about 1500 to about 15,000, the copolymer component must not contain significant amounts of higher molecular weight fractions. No more than five (5) percent of the copolymer should be of molecular weight greater than 20,000. The molecular weight distribution as measured by the ratio of weight average to number average molecular weight ($M_w/M_n$) should be in the range of 1.6 to 3.0. The preferred range of molecular weight distribution is in the range of 1.7 to 2.2.

With the appropriate monomers, hereinafter described and illustrated, the other copolymers used in the powder coating compositions of this invention can be prepared by the same methods heretofore described to prepare the epoxy-functional, hydroxy-functional copolymer. Minor adjustments in temperature, solvents, initiator, etc. may be made to optimize the preparation of a given copolymer but these are all within the day to day working skills of one skilled in the art.

The other embodiments of what has been termed the first copolymer of the blend include epoxy-functional, amide-functional copolymers and epoxy-functional anhydride-functional copolymers.

The epoxy-functional, amide-functional copolymers advantageously contains about 5 to about 20, preferably about 8 to about 15, weight percent of a glycidyl ester of a monoethylenically unsaturated acid, about 2 to about 10, preferably about 3 to about 6, weight percent of an alpha-beta olefinically unsaturated amide, e.g., acrylamide and methacrylamide, and about 70 to about 93, preferably about 79 to about 89 weight percent of monoethylenically unsaturated, quantitatively and qualitatively monofunctional monomers.

The carboxy-functional, amide-functional copolymer advantageously contains about 5 to about 20, preferably about 6 to about 15, weight percent of an alpha-beta olefinically unsaturated monocarboxylic acid, e.g., acrylic acid or methacrylic acid, about 2 to about 10, preferably about 3 to about 6, weight percent of an alpha-beta olefinically unsaturated amide, e.g., acrylamide and methacrylamide, and about 70 to about 93, preferably about 79 to about 91, weight percent of monoethylenically unsaturated, quantitatively and qualitatively monofunctional monomers.

The carboxy-functional, hydroxy-functional copolymer advantageously contains about 5 to about 20, preferably about 6 to about 15, weight percent of an alpha-beta olefinically unsaturated monocarboxylic acid, about 2 to about 10, preferably about 3 to about 6, weight percent of a hydroxy acrylate, e.g., the monohydroxy ester of a diol and acrylic or methacrylic acid, and monofunctional unsaturated monomers as in the above.

The qualitatively monofunctional copolymer provides functional groups that will coreact with two different functional groups on the first copolymer.

The composition of the preferred second copolymers are hereinafter set forth.

The anhydride-functional second copolymer advantageously contains about 5 to about 20, preferably about 8 to about 15, weight percent of an anhydride of an olefinically unsaturated dicarboxylic acid and about 80 to about 95, preferably 85 to 92, weight percent of monoethylenically unsaturated, quantitatively and qualitatively monofunctional monomers. Suitable anhydrides include maleic anhydride, itaconic anhydride, dichloromaleic anhydride, dodecenyl succinic anhydride, tetrahydrophthalic anhydride, etc.

The carboxy-functional second copolymer advantageously contains about 5 to about 20, preferably about 6 to about 15, weight percent of an alpha-beta olefinically unsaturated monocarboxylic acid, e.g., acrylic acid or methacrylic acid, and about 80 to about 95, preferably about 85 to about 94, weight percent of monoethylenically unsaturated, quantitatively and qualitatively monofunctional monomers.

The epoxy-functional second copolymer advantageously contains about 5 to about 20, preferably about 8 to about 15, weight percent of a glycidal ester of a monoethylenically unsaturated acid, e.g., glycidyl acrylate or glycidyl methacrylate, and about 80 to about 95, preferably about 85 to about 92, weight percent of monoethylenically unsaturated, quantitatively and qualitatively monofunctional monomers.

These powder coating compositions advantageously contain a flow control agent as a part of the powder coating mixture. The flow control agent is a polymer having a molecular weight ($\overline{M}_n$) of at least 1000 and advantageously comprises between 0.05 and 4.0 weight percent of the mixture. The flow control agent has a glass transition temperature at least 20° C. below the glass transition temperature of each of the copolymers.

One group of suitable flow control agents are acrylic polymers. Preferred acrylic polymers which may be used for flow control agents are polylauryl acrylate, polybutyl acrylate, poly (2-ethylhexyl acrylate), polylauryl methacrylate and polyisodecyl methacrylate. These advantageously have molecular weights in the range of about 3000 to about 20,000, preferably about 4000 to about 15,000.

The flow control agent may also be a fluorinated polymer having a surface tension, at the baking temperature of the powder, lower than that of the copolymers used in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000 (advantageously 1000 to 20,000) may also be used, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperatures will ordinarily be in the range of 130° to 200° C. and the catalyst should produce a gel time for the powder coating composition at the baking temperature to be used which is at least 1 minute but no greater than 20 minutes. This gel time is preferably between about 2 and about 9 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), tetraethyl ammonium chloride (bromide or iodide), trimethylbenzylammonium chloride, dodecyl dimethyl (2-phenoxyethyl) ammonium bromide, diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl] - 2-imidazoline phosphate, and 2-benzyl - 2-imidazoline hydrochloride. Suitable tertiary amine catalysts for the powder coating compositions of this invention include: triethylenediamine, N,N - diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dibutyl tin dilaurate and lithium benzoate.

The catalyst used in an individual powder coating composition is generally solid at room temperature and has a melting point of from 50° to 200° C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkylpoly (ethyleneoxy) phosphate or alkyllauryl poly (ethyleneoxy) phosphate; polyethyleneimine, poly (2-vinyl pyrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol - 1,4 - diglycidyl ether, diglycidyl ether of bisphenol A and its polymers and cellulose acetate butyrate.

Except in those instances herein wherein a specific compound is named, the term "acrylate" is used to include esters of both acrylic and methacrylic acid, i.e., acrylates and methacrylates.

The term "alpha-beta" unsaturation as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene.

Having described the various materials which are employed in formulating the powder coating compositions of this invention, a plurality of examples are hereinafter set forth to illustrate various individual powder coating compositions.

EXAMPLE 1

An epoxy-functional, hydroxy-functional copolymer is prepared from the below listed components in the manner hereinafter described:

| Reactants | Amounts, grms. | Percentage By Weight |
|---|---|---|
| glycidyl methacrylate | 30 | 15 |
| hydroxyethyl methacrylate | 10 | 5 |
| butyl methacrylate | 80 | 40 |
| methyl methacrylate | 80.0 | 40 |

The above listed monomers are admixed and 2,2' - Azobis - (2-methylpropionitrile), hereinafter called AIBN, in the amount of 10 grams (5% based on combined weights of reactants) are added to the monomer mixture. The solution is added dropwise over a three hour period into 200 ml. of toluene at 100° – 110° C. under nitrogen atmosphere. Then 0.2 grams of AIBN dissolved in 10 ml. acetone are added over a ½ hour period and refluxing is continued for 3 additional hours.

The polymer solution is diluted with 200 ml. acetone and coagulated in 2 liters of hexane. The white powder is dried in a vacuum oven for 24.0 hours at 55° C. The molecular weight of the copolymer is $M_w/M_n = 5380/3060$ and its Tg is 58° C.

A carboxy-functional copolymer is prepared from the below listed components in the manner hereinafter described:

| Reactants | Amounts, grms. | Percentage By Weight |
|---|---|---|
| methacrylic acid | 14.0 | 7 |
| butyl methacrylate | 120.0 | 60 |
| methyl methacrylate | 50.0 | 25 |
| styrene | 16.0 | 8 |

The amount of initiator and polymerization conditions are those used for the epoxy-functional, hydroxy-functional copolymer. The copolymer is isolated and dried.

A powder coating composition is formed by combining about 25.0 grams of the epoxy-functional, hydroxy-functional copolymer and about 30.0 grams of the carboxy-functional copolymer with the following ingredients:

| | Grams |
|---|---|
| poly (2-ethylhexyl acrylate) $M_n = 9,000$ | 0.46 |
| tetrabutylammonium iodide | 0.04 |
| titanium dioxide | 6.00 |
| Ferrite Yellow | 5.00 |

All components are ball-milled for four hours and mill-rolled for 5 minutes at 125° C. The material is granulated and pulverized to particle size range of 10 – 30 microns. The powder is free flowing.

After spraying the powder electrostatically on grounded steel panels, it is cured at 175° C. for 30 minutes. The cured films have good appearance, adhesion and impact strength. This coating also is applied to other substrates including glass, wood, brass, zinc, aluminum, copper and bronze and good adhesion is achieved. The cured films are not soluble in toluene, xylene, methyl ethyl ketone and gasoline.

EXAMPLE 2

An anhydride-functional copolymer is prepared from the below listed components in the manner hereinafter described:

| Reactants | Amount, grms. | Percent By Weight |
|---|---|---|
| maleic anhydride | 14.0 | 8 |
| butyl methacrylate | 100.0 | 50 |
| methyl methacrylate | 84.0 | 42 |

The butyl methacrylate and methyl methacrylate are admixed and 12.0 grams (6% based on combined weights of reactants) of AIBN are added to the monomer mixture. The maleic anhydride is dissolved in 50 ml. of acetone and then is mixed with the other monomers. The monomer-initiator solution is added dropwise over a two hour period into 180 ml. toluene at 80° – 90° C. under nitrogen atmosphere. Then 0.2 grams of AIBN dissolved in 5 ml. acetone are added over a half-hour period and refluxing is continued for three additional hours.

The polymer solution is diluted with 200 ml. acetone and coagulated in 2 liters of hexane. The powder is dried in a vacuum oven for 20.0 hours at 55° C. Its molecular weight is $M_w/M_n = 5400/3100$ and its Tg is 56° C.

A powder coating composition is formed by combining about 25.0 grams of the epoxy-hydroxy functional copolymer of Example 1 and 31.0 grams of the anhydride-functional copolymer are combined with the following ingredients:

| | Grams |
|---|---|
| poly (butyl acrylate) | 0.47 |
| titanium dioxide | 6.50 |
| Ferrite Yellow | 6.00 |
| diepoxide (Epichlorohydrin, Bisphenol A type, Ave. mol. wt. = 900, WPE = 500) | 3.00 |

All ingredients are combined with 150 ml. of acetone-methylene chloride mixture (1:1 by volume) and ball-milled for 15 hours. After evaporating the solvent in vacuum oven, the powder is converted to desired particle size (10–30 microns) and sprayed electrostatically on grounded steel panels. The powder is cured at 170° C. for 30 minutes. The cured films have good appearance and solvent resistance.

EXAMPLE 3

An epoxy-functional, amide-functional copolymer is prepared from the below listed components in the manner hereinafter described:

| Reactants | Amounts, grms. | Percentage By Weight |
|---|---|---|
| glycidyl methacrylate | 30.0 | 15.0 |
| methacrylamide | 10.0 | 5.0 |
| butyl methacrylate | 80.0 | 40.0 |
| methyl methacrylate | 70.0 | 35.0 |
| styrene | 10.0 | 5.0 |

The amount of initiator and polymerization conditions and procedures are those used to produce the epoxy-functional, hydroxy-functional copolymer of Example 1. The copolymer is isolated and dried. Its molecular weight is $M_w/M_n = 5500/3220$ and its Tg is 57° C.

A powder coating composition is prepared by combining 25.0 grams of epoxy-functional, amide-functional copolymer above described and 30.0 grams of the carboxy-functional copolymer of Example 1 and the following ingredients:

| | |
|---|---|
| titanium dioxide | 6.00 |
| Ferrite Yellow | 5.50 |
| poly (isododecyl methacrylate) | 0.46 |
| tetrabutylammonium bromide | 0.035 |

All of the foregoing ingredients are mixed together and processed in accordance with the procedure of Example 1 to obtain a powder coating composition. This powder is sprayed electrostatically on grounded steel panels as in the preceding examples, i.e., with an electrostatic spray gun for powder operating at 50 KV charging voltage. After deposition of the powder, the panel is baked at 175° C. for 30 minutes. The coatings obtained from this powder exhibit good adhesion to steel, glass, aluminum, zinc and bronze. The coatings also demonstrate good resistance to solvents such as toluene, xylene, methyl ethyl ketone and gasoline.

EXAMPLE 4

A powder coating composition is prepared from 25 grams of the epoxy-functional amide-functional copolymer of Example 3 and 31.0 grams of the anhydride-functional copolymer of Example 2 are combined with the following ingredients:

| | |
|---|---|
| poly (2-ethylhexyl acrylate) $M_n$ = 9,000 | 0.48 |
| titanium dioxide | 6.00 |
| Phthalocyanine blue | 4.50 |
| benzyltrimethylammonium chloride | 0.03 |

The mixture of all of these components is ball-milled for 5 hours. Then it is combined with acetone-methylene chloride solvent (1:1 by volume) and ball-milled for another 15 hours. After evaporation of the solvent and granulation of the powder to a particle size in the range of 10 to 30 microns, grounded steel panels are sprayed with this powder and cured at 170° C. for 25 minutes. These coatings demonstrate good adhesion and gloss.

EXAMPLE 5

A carboxy-functional, hydroxy-functional copolymer is prepared by copolymerizing the below listed components in the manner hereinafter described:

| Reactants | Amounts, grms. | Percentage By Weight |
|---|---|---|
| methacrylic acid | 22 | 11 |
| hydroxyethyl methacrylate | 10 | 5 |
| butyl methacrylate | 100 | 50 |
| methyl methacrylate | 50 | 25 |
| styrene | 18 | 9 |

The amount of initiator and the polymerization conditions are those used to produce the carboxy-functional copolymer of Example 1. The copolymer is isolated and dried. Its molecular weight is $M_w/M_n$ = 5600/3200 and its Tg is 57° C.

An epoxy-functional copolymer is prepared by polymerizing the below listed components in the manner hereinafter described:

| Reactants | Amounts, grms. | Percentage By Weight |
|---|---|---|
| glycidyl methacrylate | 24 | 12 |
| butyl methacrylate | 84 | 42 |
| methyl methacrylate | 82 | 41 |
| styrene | 10 | 5 |

To the mixed monomers are added 10 rams of AIBN (5% based on combined weights of reactants). The polymerization, isolation and drying of the copolymer are carried out in accordance with the methods and conditions used to prepare the exposy-functional, hydroxy-functional copolymer of Example 1. The epoxy-functional copolymer of this example has molecular weight of $M_n/M_w$ = 6700/3270 and its Tg is 59° C.

A powder paint composition is prepared by combining 35.0 grams of the epoxy-functional copolymer of this example and 25.0 grams of the carboxy-functional, hydroxy-functional copolymer of this invention with the following ingredients:

| | Grams |
|---|---|
| poly (lauryl acrylate) $M_n$ = 11,000 | 0.48 |
| titanium dioxide | 8.00 |
| Ultramarine blue | 5.0 |
| tetraethylammonium chloride | 0.05 |
| diepoxide (Epichlorohydrin, Bisphenol A type, Av. Mol. Wt. = 900, WPE = 500) | 2.00 |

The mixture of all of these components is ball-milled for 4 hours. It is then combined with acetone-methylene chloride solvent (1:1 by volume) and ball-milled for another 15 hours. After evaporation of the solvent and granulation of the powder to a particle size range of 10-30 microns, grounded steel panels are sprayed with this powder and baked at 175° C. for 25 minutes.

The glossy coatings have good adhesion to the substrate and good impact strength. These coatings demonstrate good solvent resistance to toluene, xylene, methyl ethyl ketone, methanol and gasoline.

EXAMPLE 6

A carboxy-functional, amide-functional copolymer is prepared from the below listed components in the manner hereinafter described:

| Reactants | Amounts, grms. | Percentage By Weight |
|---|---|---|
| methacrylic acid | 22.0 | 11 |
| methacrylamide | 10.0 | 5 |
| butyl methacrylate | 100.0 | 50 |
| methyl methacrylate | 50.0 | 25 |
| styrene | 18.0 | 9 |

The amount of initiator, polymerization conditions, isolation and drying of the polymer are carried out following the methods and conditions used to prepare the carboxy-functional copolymer of Example 1.

A powder coating composition is prepared by combining 25.0 grams of the carboxy-functional, amide-functional copolymer and 35.0 grams of epoxy-functional copolymer of Example 5 with the following materials:

| | Grams |
|---|---|
| poly (2-ethylhexyl acrylate) | 0.43 |
| titanium dioxide | 6.00 |
| Ferrite Yellow | 5.50 |
| tetrabutylammonium bromide | 0.03 |

All of the foregoing ingredients are mixed together and then combined with acetone-methylene chloride solvent (1:1 by volume) and ball-milled for 20 hours. After evaporation of the solvent and granulation of the powder to a particle size range of 10-25 microns, grounded steel panels are electrostatically sprayed with this powder and baked at 170° C. for 30 minutes.

The pigmented films have good appearance, adhesion and impact strength. They also show good solvent resistance to toluene, xylene, methyl ethyl ketone, methanol and gasoline.

EXAMPLE 7

The procedure of Example 1 is repeated except for differences in the composition of the epoxy-functional, hydroxy-functional copolymer. In this example, this copolymer contains 18 percent by weight of glycidyl methacrylate and 2 percent by weight of hydroxyethyl methacrylate. Adjustment to accommodate is made in the butyl methacrylate component. This powder when electrostatically sprayed upon grounded steel panels and cured thereon provides crosslinked coatings of good appearance, adhesion and solvent resistance.

EXAMPLE 8

The procedure of Example 1 is repeated except for the differences that (1) the monomer mixture used to prepare the epoxy-functional, hydroxy-functional copolymer contains 12 percent by weight glycidyl methacrylate and 8 percent by weight of hydroxyethyl methacrylate and (2) the amount of carboxy-functional copolymer used for preparing the powder coating composition is 28.0 grams. Adjustment to accommodate is made in the methacrylate component. This powder when electrostatically sprayed on grounded steel panels and cured thereon provided crosslinked coatings of good appearance.

EXAMPLE 9

The procedure of Example 1 is repeated except for the differences that (1) the epoxy-functional, hydroxy-functional copolymer is made from a mixture of monomers which has the following monomer composition:

| Reactant | Percentage By Weight |
|---|---|
| glycidyl methacrylate | 12 |
| hydroxyethyl methacrylate | 5 |
| butyl methacrylate | 40 |
| methyl methacrylate | 43 |

The carboxy-functional copolymer is made from a mixture of monomers which has the following monomer composition:

| Reactant | Percentage By Weight |
|---|---|
| methacrylic acid | 15 |
| butyl methacrylate | 55 |
| methyl methacrylate | 25 |
| styrene | 5 | and (3) equimolar amounts of the two copolymers are used in preparing the powder coating composition. This powder when electrostatically sprayed on grounded steel panels and cured thereon provides crosslinked coatings of good appearance.

EXAMPLE 10

The procedure of Example 2 is repeated except for the differences in the composition of the epoxy-functional, hydroxy-functional copolymer. In this example, this copolymer contains 18 percent by weight of glycidyl methacrylate and 2 percent by weight hydroxyethyl methacrylate. Adjustment to accommodate is made in the butyl methacrylate component. This powder when electrostatically sprayed on grounded steel panels and cured thereon provides crosslinked coating of good appearance.

EXAMPLE 11

The procedure of Example 2 is repeated except for differences in the composition of the epoxy-functional, hydroxy-functional copolymer. In this example, this copolymer contains 13 percent by weight glycidyl acrylate and 7 percent hydroxypropyl acrylate. This powder when electrostatically sprayed on grounded steel panels and cured thereon provides crosslinked coatings of good appearance.

EXAMPLE 12

The procedure of Example 2 is repeated except for the differences that (1) the epoxy-functional, hydroxy-functional copolymer is prepared from a mixture of monomers of the following composition:

| Reactants | Percentage By Weight |
|---|---|
| glycidyl methacrylate | 12 |
| hydroxyethyl methacrylate | 5 |
| butyl methacrylate | 40 |
| methyl methacrylate | 43 | and (2) the anhydride-functional is prepared from a mixture of monomers of the following composition:

| Reactants | Percentage By Weight |
|---|---|
| maleic anhydride | 12 |
| butyl methacrylate | 48 |
| methyl methacrylate | 40 | and (3) equimolar amounts of the two polymers are used for the preparation of a powder coating composition. This powder when electrostatically sprayed on grounded steel panels and cured thereon provides crosslinked coatings of good appearance.

EXAMPLE 13

The procedure of Example 3 is repeated except for differences in the composition of the epoxy-functional, amide-functional copolymer. In this example, the copolymer contains 18 percent by weight of glycidyl methacrylate and 2 percent of acrylamide are substituted for the methacrylamide. Adjustment to accommodate is made in the butyl-methacrylate component. This powder coating material when electrostatically sprayed on grounded steel panels and cured thereon provides crosslinked coatings of good appearance.

EXAMPLE 14

The procedure of Example 3 is repeated except for differences in the composition of the epoxy-functional, amide-functional copolymer. In this example, this copolymer contains 13 percent by weight glycidyl methacrylate and 7 percent by weight of methacrylamide. This powder coating material when electrostatically sprayed on grounded steel panels and cured thereon provides crosslinked coatings of good appearance.

EXAMPLE 15

The procedure of Example 3 is repeated except for the differences that (1) the epoxy-functional, amide-functional copolymer is prepared from a monomer mixture of the following composition:

| Reactants | Percentage By Weight |
|---|---|
| glycidyl methacrylate | 12 |
| methacrylamide | 5 |
| butyl methacrylate | 40 |
| methyl methacrylate | 43 |

(2) the carboxy-functional copolymer is prepared from a mixture of monomers of the following composition:

| Reactants | Percentage By Weight |
|---|---|
| methacrylic acid | 12 |
| butyl methacrylate | 55 |
| methyl methacrylate | 28 |
| styrene | 8 | and (3) equimolar amounts of the epoxy-functional, amide-functional copolymer and the carboxy-functional copolymer are used for the preparation of the powder coating composition.

This powder coating material when electrostatically sprayed on grounded steel panels and cured thereon provides crosslinked coatings of good appearance.

EXAMPLE 16

The procedure of Example 4 is repeated except for the difference that the copolymers are prepared from the monomer mixtures used to prepare the copolymers in Example 12 with the single exception that 5 weight percent of methacrylamide is substituted for 5 weight percent of hydroxyethyl methacrylate.

EXAMPLE 17

The procedure of Example 5 is repeated except for the differences that (1) the carboxy-functional, hydroxy-functional copolymer is prepared from a mixture of monomers of the following composition:

| Reactants | Percentage By Weight |
|---|---|
| methacrylic acid | 15 |
| hydroxyethyl acrylate | 3 |
| butyl methacrylate | 53 |
| methyl methacrylate | 20 |
| styrene | 7 | and (2) the amount of the epoxy-functional copolymer is changed to 42.0 grams.

EXAMPLE 18

The procedure of Example 5 is repeated except for the differences that the carboxy-functional, hydroxy-functional copolymer contains 8 percent by weight of methacrylic acid and 8 percent by weight of hydroxyethyl methacrylate. Adjustment is made in the butyl methacrylate component.

EXAMPLE 19

The procedure of Example 5 is repeated except for the differences that the carboxy-functional, hydroxy-functional copolymer has the following composition:

| Reactant | Percentage By Weight |
|---|---|
| methacrylic acid | 4 |
| acrylic acid | 4 |
| hydroxyethyl methacrylate | 3 |
| hydroxybutyl methacrylate | 2 |
| methyl methacrylate | 28 |
| styrene | 9 |

(2) the epoxy-functional copolymer has the following composition:

| Reactant | Percentage By Weight |
|---|---|
| glycidyl methacrylate | 15 |
| butyl methacrylate | 42 |
| methyl methacrylate | 38 |
| styrene | 5 | and (3) equimolar amounts of the two copolymers are used to prepare a powder coating material.

EXAMPLE 20

The procedure of Example 6 is repeated except for the differences that (1) the carboxy-functional, amide-functional copolymer has the following composition:

| Reactants | Percentage By Weight |
|---|---|
| acrylic acid | 15 |
| methacrylamide | 3 |
| butyl methacrylate | 30 |
| butyl acrylate | 25 |
| methyl methacrylate | 20 |
| alpha methyl styrene | 7 | and (2) the amount of epoxy-functional copolymer used in preparation of this powder composition is changed to 41.0 grams.

EXAMPLE 21

The procedure of Example 6 is repeated except for the differences that (1) the carboxy-functional, amide-functional copolymer contains 8 percent by weight methacrylic acid and 8 percent by weight of methacrylamide and adjustment to accommodate is made in the butyl methacrylate component, and (2) and equimolar amount of the epoxy-functional copolymer is used for preparing the powder coating material.

EXAMPLE 22

The procedure of Example 21 is repeated except for using 8 percent by weight of methacrylic acid and 3 percent by weight of methacrylamide and adjustment is made in the butyl methacrylate component.

EXAMPLE 23

The procedures of Examples 2, 10, 11 and 12 are repeated with the exception that in the preparation of the anhydride-functional copolymer the maleic anhydride is replaced with an equimolar amount of itaconic anhydride.

EXAMPLE 24

The procedure of Example 5 is repeated except that an equivalent amount of itaconic acid is substituted for the methacrylic acid.

EXAMPLE 25

The procedure of Example 1 is repeated except for the following differences:
(1) The composition of the epoxy-functional, hydroxy-functional copolymer is as follows:

| Reactants | Percentage By Weight |
|---|---|
| glycidyl methacrylate | 15 |
| hydroxyethyl methacrylate | 5 |
| vinyl chloride | 20 |
| vinyl toluene | 5 |
| ethyl acrylate | 5 |
| butyl acrylate | 25 |
| methyl methacrylate | 25 |

(2) the amount of AIBN initiator used is equal to 7 percent based on the combined weight of the monomers, (3) the composition of the carboxy-functional copolymer is as follows:

| Reactants | Percentage By Weight |
|---|---|
| methacrylic acid | 15 |
| butyl methacrylate | 55 |
| methyl methacrylate | 25 |
| t-butyl styrene | 5 | and (4) the amount of AIBN (initiator) used is equal to 7 percent based on the molecular weight of the combined reactants. Copolymers having molecular weight near the bottom of the claimed range are thus prepared.

EXAMPLE 26

The procedure of Example 2 is repeated except for the differences that (1) the composition of the epoxy-functional, hydroxy-functional copolymers is as follows:

| Reactants | Percentage By Weight |
|---|---|
| glycidyl methacrylate | 5 |
| hydroxyethyl methacrylate | 10 |
| t-butyl styrene | 5 |
| chloro styrene | 10 |
| acrylonitrile | 5 |
| butyl methacrylate | 35 |
| methyl methacrylate | 30 |

(2) the amount of AIBN (initiator) used is 0.8 percent based on combined weight of reactants, (3) the anhydride-functional copolymer has the following composition:

| Reactants | Percentage By Weight |
|---|---|
| maleic anhydride | 5 |
| butyl methacrylate | 50 |
| methyl methacrylate | 45 | and (4) the amount of AIBN (initiator) used is 0.8 percent based on combined weight of reactants. Copolymers having molecular weight near the top of the claimed range are thus produced.

EXAMPLE 27

The powder coating compositions of Examples 16 through 26 are sprayed on a variety of substrates including steel, brass, aluminum and glass and cured thereon as in the preceding examples. The coatings thus obtained are crosslinked coatings of good appearance.

Many modifications of these examples will be apparent to those skilled in the art in view of this specification. It is intended that all such modifications which fall within the scope of the invention be included within the appended claims.

We claim:

1. In a thermosettable powder paint which exclusive of pigments, catalysts, antistatic agents, and plasticizers, the same being conventional non-reactive additives to a thermosettable powder paint, consists essentially of a coreactable particulate mixture of
   A. an epoxy-functional copolymer of monoethylenically unsaturated monomers consisting essentially of about 5 to about 20 weight percent of a glycidyl ester of a monoethylenically unsaturated carboxylic acid and about 80 to about 95 weight percent of other monoethylenically unsaturated monomers, and having a glass transition temperature in the range of about 40° to about 90° C. and a molecular weight in the range of about 1500 to about 15,000,
   B. as crosslinking agent, a carboxy-functional polymer,
   C. 0.05 to about 4 weight percent of a non-reactive polymeric flow control agent based on the weight of said coreactable particulate mixture,
   the improvement wherein:
   1. said epoxy-functional copolymer is qualitatively difunctional and said other monoethylenically unsaturated monomers consist essentially of difunctional monomers selected from the group consisting of hydroxyethyl acrylates and methacrylates, hydroxypropyl acrylates and methyacrylates, and hydroxybutyl acrylates and methacrylates in an amount comprising about 2 to about 10 weight percent of said copolymer and monoethylenically unsaturated monomers consisting essentially of monofunctional monomers selected from the group consisting of esters of a $C_1 - C_8$ monohydric alcohol and acrylic acid, esters of a $C_1 - C_8$ monohydric alcohol and methacrylic acid and $C_8 - C_{12}$ monovinyl hydrocarbons, and
   2. said carboxy-functional polymer has molecular weight in the range of about 1500 to about 15,000 and is a copolymer of about 5 to about 20, weight percent of an alpha-beta olefinically unsaturated monocarboxylic acid selected from acrylic and methacrylic acid and about 80 to about 95 weight percent of alpha-beta, monoethylenically unsaturated monomers consisting essentially of monofunctional monomers selected from the group consisting of esters of a $C_1 - C_8$ monohydric alcohol and a monocarboxylic acid selected from acrylic acid and methacrylic acid, and $C_8 - C_{12}$ monovinyl hydrocarbons, said esters of a $C_1 - C_8$ monohydric alcohol and a monocarboxylic acid selected from acrylic acid and methacrylic acid comprising in excess of 50 weight percent of said carboxy-functional polymer, and is present in said coreactive particulate mixture in an amount that provides about 0.4 to about 1.4 carboxyl groups per functional group on said epoxy-functional copolymer.

2. A powder paint in accordance with claim 1 wherein said glycidyl ester of a monoethylenically unsaturated carboxylic acid is selected from the group consisting of glycidyl acrylate and glycidyl methacrylate and said carboxy-functional polymer is present in said coreactive particulate mixture in an amount that provides about 0.8 to about 1.1 functional groups per functional group on said epoxy-functional copolymer.

* * * * *